(12) United States Patent
Caruel

(10) Patent No.: US 12,078,124 B2
(45) Date of Patent: Sep. 3, 2024

(54) THRUST REVERSER ASSEMBLY FOR A TURBOJET ENGINE

(71) Applicant: SAFRAN NACELLES, Gonfreville-l'Orcher (FR)

(72) Inventor: Pierre Charles Caruel, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/565,461

(22) PCT Filed: May 30, 2022

(86) PCT No.: PCT/FR2022/051029
§ 371 (c)(1),
(2) Date: Nov. 29, 2023

(87) PCT Pub. No.: WO2022/254141
PCT Pub. Date: Dec. 8, 2022

(65) Prior Publication Data
US 2024/0254946 A1 Aug. 1, 2024

(30) Foreign Application Priority Data
May 31, 2021 (FR) ..................................... 2105724

(51) Int. Cl.
*F02K 1/76* (2006.01)
*F02K 1/72* (2006.01)

(52) U.S. Cl.
CPC ................ *F02K 1/763* (2013.01); *F02K 1/72* (2013.01); *F02K 1/766* (2013.01); *F05D 2240/11* (2013.01)

(58) Field of Classification Search
CPC ............. F02K 1/72; F02K 1/763; F02K 1/766
See application file for complete search history.

(56) References Cited

U.S. PATENT DOCUMENTS

| 6,663,042 B2 * | 12/2003 | Hatrick | B64D 33/04 244/110 B |
| 8,122,702 B2 * | 2/2012 | Tsou | F02K 1/72 244/129.4 |

(Continued)

FOREIGN PATENT DOCUMENTS

| EP | 3388657 A1 | 10/2018 |
| WO | 2011117555 A1 | 9/2011 |

(Continued)

OTHER PUBLICATIONS

Search Report and Written Opinion issued in International Application No. PCT/FR2022/051029, mailed on Sep. 2, 2022.

(Continued)

*Primary Examiner* — Kyle Robert Thomas
(74) *Attorney, Agent, or Firm* — Bookoff McAndrews, PLLC (57) ABSTRACT

The invention relates to a thrust reverser assembly for a turbojet engine, comprising a stationary structure having a main axis; a shroud, movable and capable of translational movement along the main axis between an attached position in which the shroud is attached to the stationary structure, and a spaced position in which the shroud is spaced from the stationary structure; at least one latch capable of holding the stationary structure and the shroud in the attached position; at least one actuator mounted between the stationary structure and the shroud and configured to move the shroud along the main axis between the attached position and the spaced position; and a seal configured to provide a seal between the stationary structure and the shroud in the attached position, wherein the seal has a tapered cross section.

11 Claims, 7 Drawing Sheets

(56) References Cited

U.S. PATENT DOCUMENTS

| | | | |
|---|---|---|---|
| 8,635,851 B2* | 1/2014 | Vauchel | F02K 1/70 |
| | | | 244/110 B |
| 9,677,502 B2* | 6/2017 | Caruel | F02K 1/72 |
| 2014/0000237 A1 | 1/2014 | Lucas et al. | |

FOREIGN PATENT DOCUMENTS

| | | | |
|---|---|---|---|
| WO | 2015112239 A1 | 7/2015 | |
| WO | 2021044097 A1 | 3/2021 | |

OTHER PUBLICATIONS

Search Report issued in French Application No. 2105724, mailed on Feb. 10, 2022.

\* cited by examiner

THRUST REVERSER ASSEMBLY FOR A TURBOJET ENGINE

CROSS-REFERENCE TO RELATED APPLICATIONS

This is a National Stage Application under 35 U.S.C. § 371 of International Application No. PCT/FR2022/051029, filed May 30, 2022, now published as WO 2022/254141 A1, which claims priority to French Patent Application No. 2105724, filed on May 31, 2021, the entireties of which are incorporated herein by reference.

TECHNICAL FIELD

The present disclosure relates to a thrust reverser assembly for a turbojet, and more particularly to a thrust reverser gasket.

A thrust reverser assembly of this type can be used for any type of turbojet engine, in particular for civil aviation turbojet engines.

PRIOR ART

Thrust reversers are elements of a turbojet engine allowing a portion of the air flow passing through the turbojet engine to be oriented forward, in order to reverse the thrust exerted by the turbojet engine and slow the aircraft on which the turbojet engine is mounted in the event of a landing or emergency braking, for example when aborting a takeoff.

In particular, among the known thrust reversers are found cascade type thrust reversers. The latter comprise cascades extending over a circumference of the turbojet and having aerodynamic profiles directed forward, as well as jacks driving the cascades and a movable cowling. Under normal circumstances, a fixed cowling covers the cascades, thus preventing air from escaping the turbojet engine through the latter; on the other hand, when the reverser is activated, the cascades and the movable cowling slide along the turbojet engine, freeing the cascade and thus allowing air to escape and be redirected forward.

In certain thrust reverser assemblies of this type, latches are present between the stationary portion and the movable portion, in order to hold them in position attached to one another. In such a position, a gasket is compressed between the stationary portion and the movable portion in order to prevent air from escaping through the cascades.

Usually, in thrust reverser assemblies of this type, the movable cowling is driven in translation by two jacks, generally located axisymmetrically. Such a structure requires great accuracy in assembly in order to obtain a tight assembly between the stationary portion and the movable portion of the thrust reverser assembly and thus provide a seal between the latter while stressing as little as possible the stationary structure. In addition, the control of the two jacks must be synchronized so as not to introduce additional stresses into the movable cowling.

It is then advantageous to produce a thrust reverser assembly for a turbojet which comprises only a single jack. In fact, a configuration of this type offers facilitated assembly and simplifies the control of the jack.

However, the use of a single jack unbalances the structure of the reverser assembly. In fact, the closure of the thrust reverser assembly is obtained by the axial force of the jack located on the periphery of the turbojet engine, which tends to incline and impede the movable portion relative to the axis of the thrust reverser assembly. The force transmitted by the jack to compress the gasket and engage the movable portion against the stationary portion is then unequally transmitted, which causes a risk of leakage, or even incorrect latching of the movable portion against the stationary portion.

This then requires imposing an additional stroke at the jack so that the movement is sufficient at the latches to ensure their operation.

There thus exists a need for a thrust reverser assembly for a turbojet engine which facilitates the engagement of the latches during the operation of the thrust reverser assembly, and which lack, at least in part, the disadvantages of the aforementioned known configurations.

DISCLOSURE OF THE INVENTION

The present disclosure relates to a thrust reverser assembly for a turbojet engine, comprising a stationary structure having a main axis, a movable shroud, capable of moving in translation along the main axis between an attached position, in which the shroud is attached to the stationary structure, and a spaced position, in which the shroud is spaced from the stationary structure, at least one latch capable of holding the stationary structure and the shroud in the attached position, at least one actuator mounted between the stationary structure and the shroud, configured to move the shroud along the main axis between the attached position and the spaced position, and a gasket configured to provide a seal between the stationary structure and the shroud in the attached position, in which the gasket has a varying cross section along its circumference.

What is meant by circumference is a line following the gasket along its main curvilinear direction. What is meant by cross section is a transverse section of the gasket perpendicular to the main curvilinear direction of the gasket. What is meant by varying cross section is that the cross section of the gasket, hence its profile in transverse section, is variable along its circumference. In particular, one or more parameters of its profile can vary, and particularly its height, its area, its width, its diameter, etc.

A thrust reverse assembly of this type has the advantage of safeguarding the closure of the thrust reverser assembly and allowing the cross section of the gasket, hence the force necessary for the closure of the gasket, to adapt to the force transmitted by the jack through said cross section of the gasket.

In certain embodiments, the height of the gasket decreases monotonically between a maximum cross section having a maximum height and a minimum cross section having a minimum height.

What is meant by monotonic is monotonic in the mathematical sense, i.e. that when following the gasket from the maximum cross section toward the minimum cross section, the height is decreasing without necessarily being strictly decreasing.

In certain embodiments, the reduction in the height of the gasket between the maximum cross section and the minimum cross section is comprised between 30% and 70%, preferably between 40% and 60%.

In certain embodiments, the maximum cross section is located in proximity to the actuator and the minimum cross section is far from the actuator.

In certain embodiments, the gasket comprises several portions having cross sections with substantially constant heights, preferably a maximum portion having a cross section of maximum height, a minimum portion having a cross section of minimum height, and at least one intermediate portion provided between the maximum and minimum portions.

It will be understood that each of the portions with maximum, minimum and intermediate cross sections are not necessarily continuous. In particular, the portion with an intermediate cross section can comprise two respectively continuous portions of the gasket but located on either side of the portions with maximum and minimum cross sections.

The portions having cross sections with substantially constant heights can be interconnected by regions with variable heights, in order to ensure the continuity of the cross section of the gasket.

The criterion of height reduction between the maximum cross section and the minimum cross section can be replaced and/or completed by other criteria for the values having a maximum at the maximum cross section and a minimum and the minimum cross section. For example, the area of the cross section of the gasket can be varying and therefore, in particular, decrease between the maximum cross section and the minimum cross section. In another example, the diameter and/or the perimeter of the cross section of the gasket, or of the body of the gasket, can be varying and therefore, in particular, decrease between the maximum cross section and the minimum cross section.

The height of the gasket, or any other parameter varying between the maximum cross section and the minimum cross section, can be continuous. What is meant by continuous is continuity in the mathematical sense, i.e. that when following the length of the gasket, the height, or more generally the parameter in question, does not decrease suddenly, for example due to a peak.

In certain embodiments, the gasket comprises several segments nested within each other.

What is meant by nesting is the form-fitting assembly of two segments, reversible or not. For example the nesting segments can each have an end of which the outer cross section is substantially in the form of the inner cross section of the portion of the gasket in which it is intended to nest.

In certain embodiments, the shroud is able to be brought into an interlocking position, located further forward than the attached position and in which the gasket is more compressed than in the attached position, in order to interlock the latch between the stationary structure and the shroud.

In the interlocking position, the gasket is compressed due to the action of the actuator. Once retraction sufficient to interlock the latches is attained, the actuator relaxes and the gasket expands slightly to be compressed by the latches.

In certain embodiments, the gasket is hollow and has pressurization holes on an inner face.

A hollow gasket is a gasket of which the cross section has a material contour surrounding a material void. Examples of hollow gaskets are known to a person skilled in the art, for example under the designation of omega or P gaskets.

What is meant by the inner face of the gasket is the face of the gasket oriented toward the inside of the turbomachine. In other words, the inner face of the gasket is that which is in contact with the stream of the turbomachine when the reverser is closed, i.e. when the shroud is in the attached position.

The pressurization holes allow the gasket to be inflated in order to increase the contact force with the facing wall, so as to limit leakage as much as possible.

In certain embodiments, the gasket is an annular gasket extending continuously over 360°. The gasket is thus uninterrupted over its entire length, i.e. along the entire circumference of the stationary structure, in order to provide a seal between the stationary structure and the shroud.

In certain embodiments, the gasket comprises a body configured to accommodate a sealing portion of the shroud or of the stationary structure.

What is meant by sealing portion is a portion provided to compress the gasket, for example a gasket compressor or a flange.

In certain embodiments, the gasket comprises a base engaged in a gasket support of the stationary structure or of the shroud. The support can take any form allowing holding the gasket, for example having a contour surrounding the base of the gasket. The base and the body of the joint can be merged. In certain embodiments, the gasket is secured to the stationary structure. The sealing portion is then carried by the shroud, while the gasket support is carried by the stationary structure. However, the reverse configuration is possible.

In certain embodiments, the reverser assembly has a single actuator.

However, in other embodiments, the thrust reverse assembly can comprise several actuators, in particular actuators located asymmetrically.

What is meant by asymmetrically is asymmetry relative to a central symmetry, for example an asymmetry of positioning or of dimensioning of the actuators or any other configuration resulting in a risk of impeding the movable portion during the actuation of the jacks.

In the presence of several actuators, the maximum and minimum cross sections can be understood to be cross sections the heights of which have respectively a local maximum and a local minimum.

In certain embodiments, at least one actuator is a jack.

In certain embodiments, the latch has a first portion on the shroud and a second portion on the stationary structure, the first and second portions being able to be assemble form-fittingly, be latched one against the other by any reversible latching means known to a person skilled in the art.

In certain embodiments, the reverser assembly comprises two latches.

In certain embodiments, at least one latch, and preferably each latch, is located at more than 60° from the actuator. The two latches can in particular be located at substantially 0° and 180° positions when the position of a jack corresponds to 90°.

The structure of the reverser is not limited to two latches, and it is understood that the latches can be present in symmetrical pairs, or even any number of latches evenly distributed over the circumference of the reverser assembly.

In certain embodiments, the transverse section of the body of the gasket has a substantially ellipsoidal shape having a flat or lips brought into contact with a sealing portion of the shroud, rectangular with rounded edges or any other shape known to a person skilled in the art allowing providing a good seal.

In certain embodiments, the gasket is made of a material having a greater stiffness in proximity to the actuator than at a distance from the actuator. This allows slightly adjusting the force necessary for the closure of the thrust reverser.

The present disclosure also relates to a propulsion assembly including a turbojet engine and a thrust reverse according to any one of the preceding embodiments.

The present disclosure also relates to an aircraft comprising a propulsion assembly according to any one of the preceding embodiments.

The aforementioned features and advantages, as well as others, will appear upon reading the detailed description that follows, of exemplary embodiments of the device and of the method proposed. This detailed description makes reference to the appended drawings.

BRIEF DESCRIPTION OF THE DRAWINGS

The appended drawings are schematic and seek primarily to illustrate the principles of the disclosure.

In these drawings, from one figure to another, identical elements (or portions of elements) are labeled by the same reference symbols. In addition, elements (or portions of elements) belonging to a different exemplary embodiment but having a similar function are labeled on the figures by numerical references incremented by 100.

DESCRIPTION OF EMBODIMENTS

In the present disclosure, the terms "axial," "radial," "tangential," "circumferential," "inner," "outer" and their derivatives are defined with respect to the main axis of the turbomachine; what is meant by "axial plane" is a plane passing through the main axis of the turbomachine, and by "radial plane" a plane perpendicular to this main axis; The terms "upstream," "downstream," "front" and "rear" are defined with respect to the circulation of air in the turbomachine; angular positions are considered within a cylindrical reference frame having as its axis the main axis of the turbomachine, angles being counted positive in the counter-clockwise direction seen from the downstream side of the turbomachine; finally, the terms "height" and "width" are defined in the local axial plane according to the axial and radial directions, respectively; and unless otherwise stated, two elements are considered "close" or "in proximity" (respectively "distant" or "far") if their angular positions are close (respectively "distant") in the cylindrical reference frame, preferably less than 30°, more preferably less than 10°.

Figure 1:
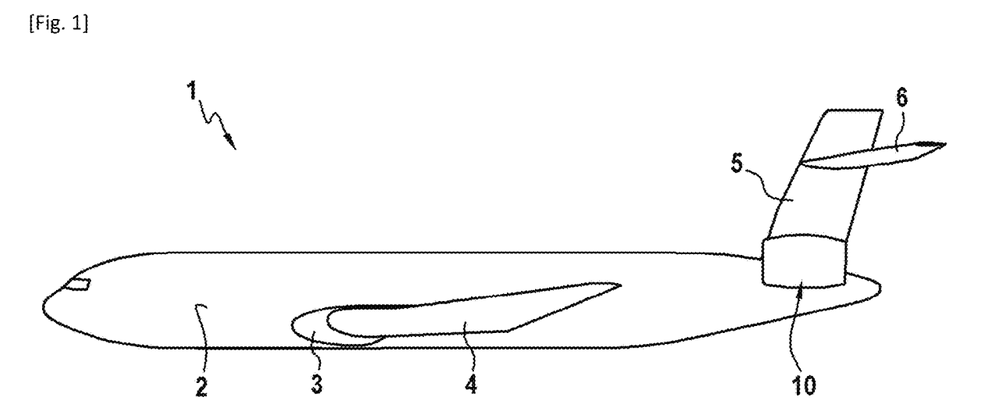
FIG. 1 is a side view of an example of an aircraft.

FIG. 1 is a schematic side view of an example of an aircraft 1, comprising a fuselage 2 from which an airfoil 4 extends laterally through fillets 3. The aircraft 1 has an empennage at the rear, comprising a fin 5 to which is attached a horizontal plane 6. A turbojet engine 10 is mounted on each side of the fuselage 2, at the rear of it, by means of an engine pylon.

The example aircraft 1 of FIG. 1 is solely illustrative, and any other arrangement of the structure elements is possible according to the general knowledge of a person skilled in the art. In particular, the turbojet engines 10 are not limited to two, and can be arranged below the airfoil 4 rather than at the rear of the fuselage 2.

Figure 2:
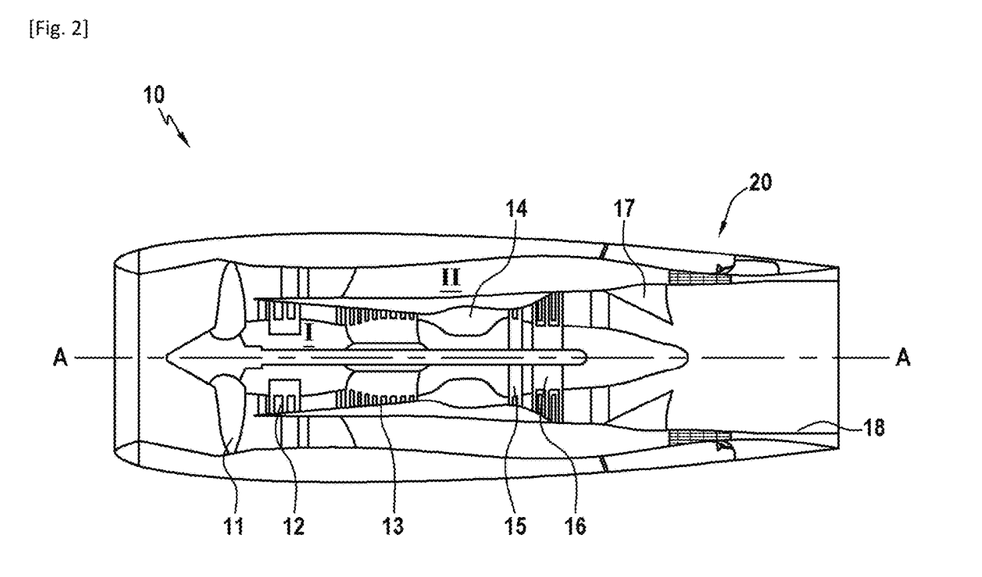
FIG. 2 is an axial section view of an example of a turbojet with mixed flows.

FIG. 2 shows an example of a turbojet engine 10 with mixed flows having a main axis A shown as a mixed line. The flow of the air in the turbojet engine 10 is shown on the schematic from left to right. The inlet of the turbojet engine 10 has a fan 11 driving the air inside the turbojet engine 10. The air flow is then divided into a primary air flow I and a secondary air flow II. The primary air flow I is compressed successively by a low-pressure compressor 12 and a high-pressure compressor 13, driven respectively by a low-pressure turbine 16 and a high-pressure turbine 15. Between the compressors 12, 13 and the turbines 15, 16 is located a combustion chamber 14 receiving the air compressed by the compressors 12, 13 and in which is injected the fuel in order to proceed with combustion. The combustion gases leave the combustion chamber 14 while driving the turbines 15 and 16 and joining the secondary air flow II at the outlet, the latter passing through the turbojet engine 10 at the radial periphery of the primary air flow I. A mixer 17 is positioned at the outlet of the turbines 15, 16 in order to favor the mixing of the two gas flows I, II and thus optimized the total thrust of the gases leaving through the nozzle 18, at the distal end of the turbojet engine 10.

The turbojet engine 10 example of FIG. 2 is illustrative and the turbojet engine 10 is not limited to this embodiment.

A rear portion of the turbojet engine 10 has a thrust reverser assembly 20, located on a circumference of the turbojet engine 10.

Figure 3:
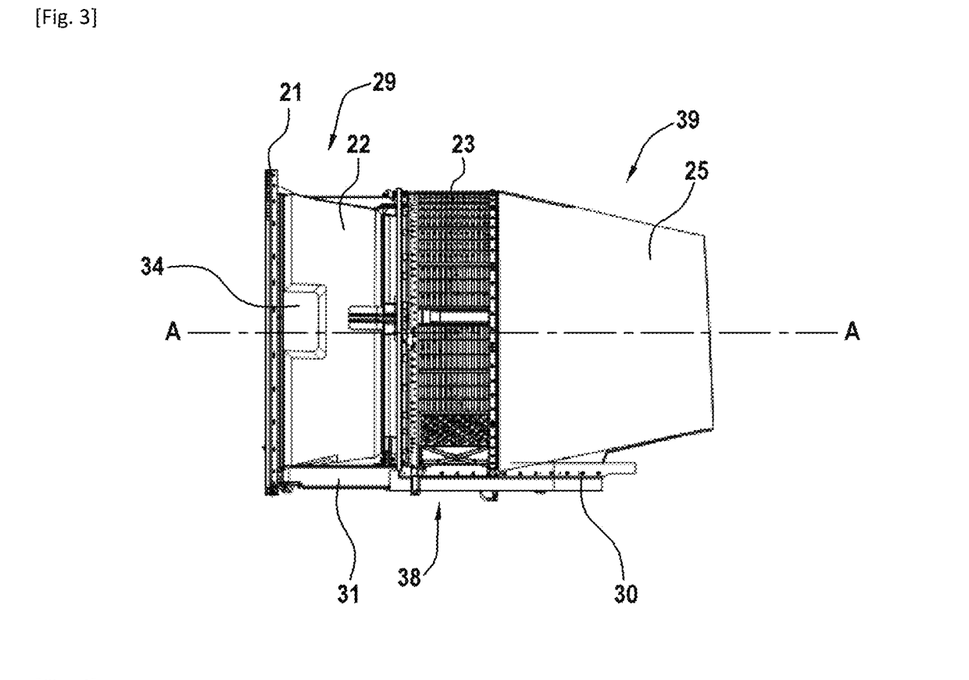
FIG. 3 shows a side view of an example of a thrust reverser assembly in which the nacelle is not shown.
Figure 4:
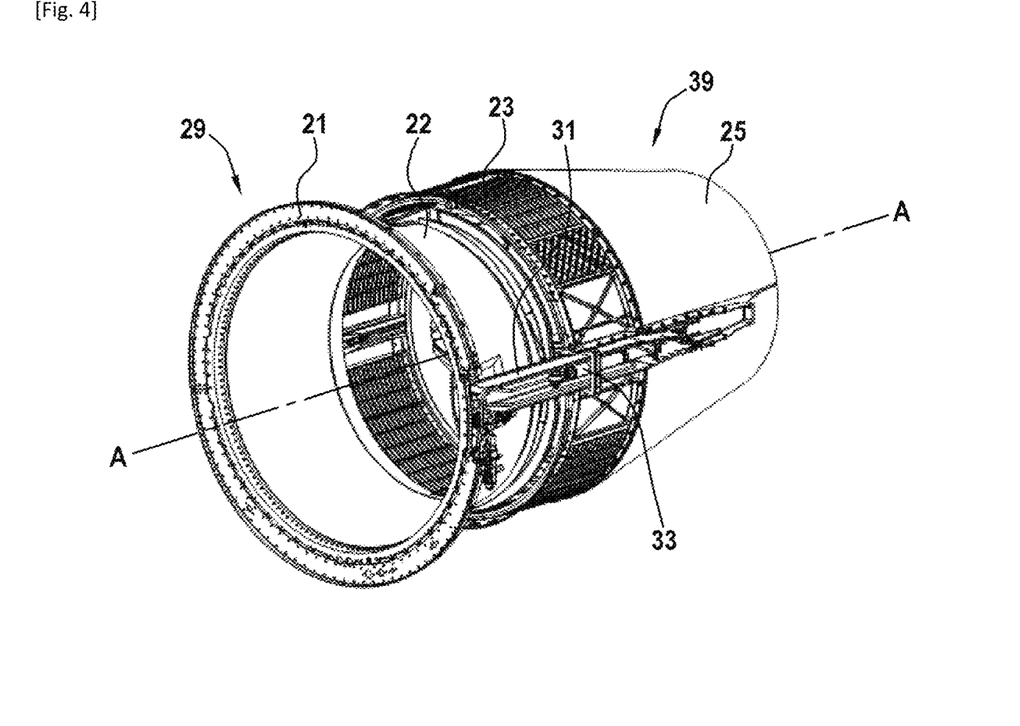
FIG. 4 shows a perspective view of this thrust reverser assembly.
Figure 5:
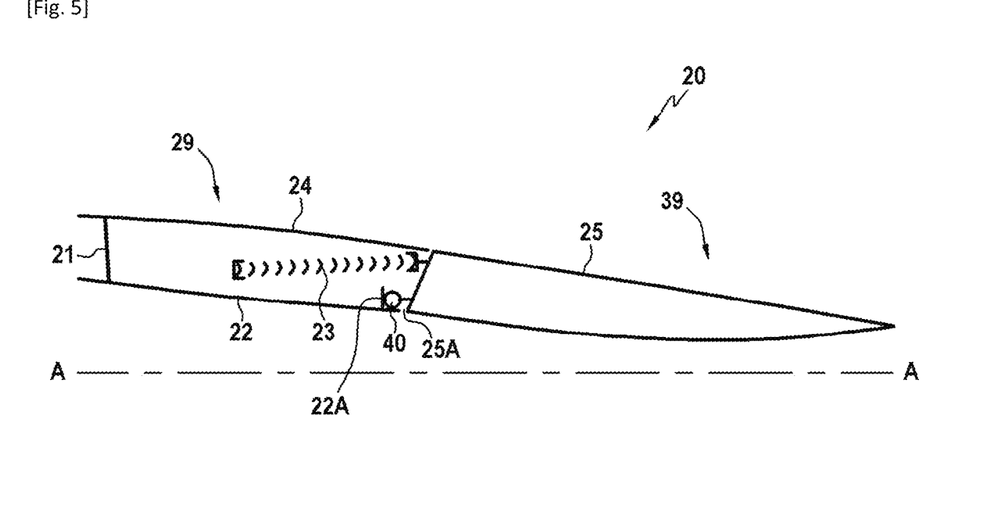
FIG. 5 is a section view in an axial plane showing a first example of this thrust reverser assembly.

FIGS. 3 and 4 show respectively side and perspective views of this thrust reverser assembly 20, in which a cowling 24 has not been shown in order to reveal the internal structure of the thrust reverser 20; this cowling 24 will be shown with reference to FIG. 5.

The thrust reverser 20 comprises a stationary portion 29, comprising the stationary parts within the reference frame of the engine, and portion 39, movable in translation relative to the stationary portion 29.

The fixed portion 29 comprises an attachment flange 21, allowing the thrust reverser 20 to be attached to a turbojet engine 10 casing, a stationary structure 22 surrounding a stream of the engine, and a fixed cowling 24 (visible in FIG. 5) surrounding the stationary structure 22.

The movable portion 39 is coaxial with the stationary portion 29 and comprises at least one reverser cascade 23, extending over a circumferential contour of the turbojet engine 10, and a shroud 25. The shroud 25, provided downstream of the cascades 23, is configured to be attached in a sealed manner to the stationary portion 29 in the closed state. In the closed state, the cascade 23 is located between the stationary structure 22 and the fixed cowling 24. The movable portion also comprises at least one blocking panel allowing obstructing the direct outlet of the engine in order to deflect the flow of air through the cascades 23 during the operation of the reverser 20.

The thrust reverser assembly comprises an actuation device 38, comprising a beam 31, a slide 30 and a driving device 33. The beam 31 is secured to the stationary portion 29 and extends axially along the outer surface of the stationary portion 29; the slide 30 is secured to the movable portion 39 and mounted in translation on the beam 31; for its part, the driving device 33 is mounted between the beam 31 and the slide 30 in order to drive the movable portion 39 in translation relative to the fixed portion 29.

In the present example, the driving device 33 takes the form of a single jack 33. The action of this jack 33 is described with reference to FIG. 5.

FIG. 5 is a section in an axial plane of the thrust reverser assembly 20. In particular, FIG. 5 shows the cowling 24, the shroud 25 and the cascades 23.

Other than during the operation of the thrust reverser 20, the shroud 25 is attached in a sealed manner to the stationary portion 29, thus preventing the passage of air through the cascades 23.

The movable portion 39 is mounted in axial translation relative to the stationary portion 29, and the action of the driving device 33 allows the thrust reverser 20 to enter into an open state in which the shroud 25 and the cascades 23 are disengaged from the fixed cowling 24 so that an air passage is left between the stationary portion 29 and the movable portion 39. This air passage passes through the cascades 23, the orientation of which allows redirecting the flow of air outward, and thus slowing the aircraft 1.

FIG. 5 shows a first example of the thrust reverser assembly, in which the stationary structure 22 has a gasket support 22A at its downstream end, the support allowing accommodating the gasket 40 against which a sealing portion formed by a gasket compressor 25A carried by the shroud 25 presses while flattening it.

Figure 6:
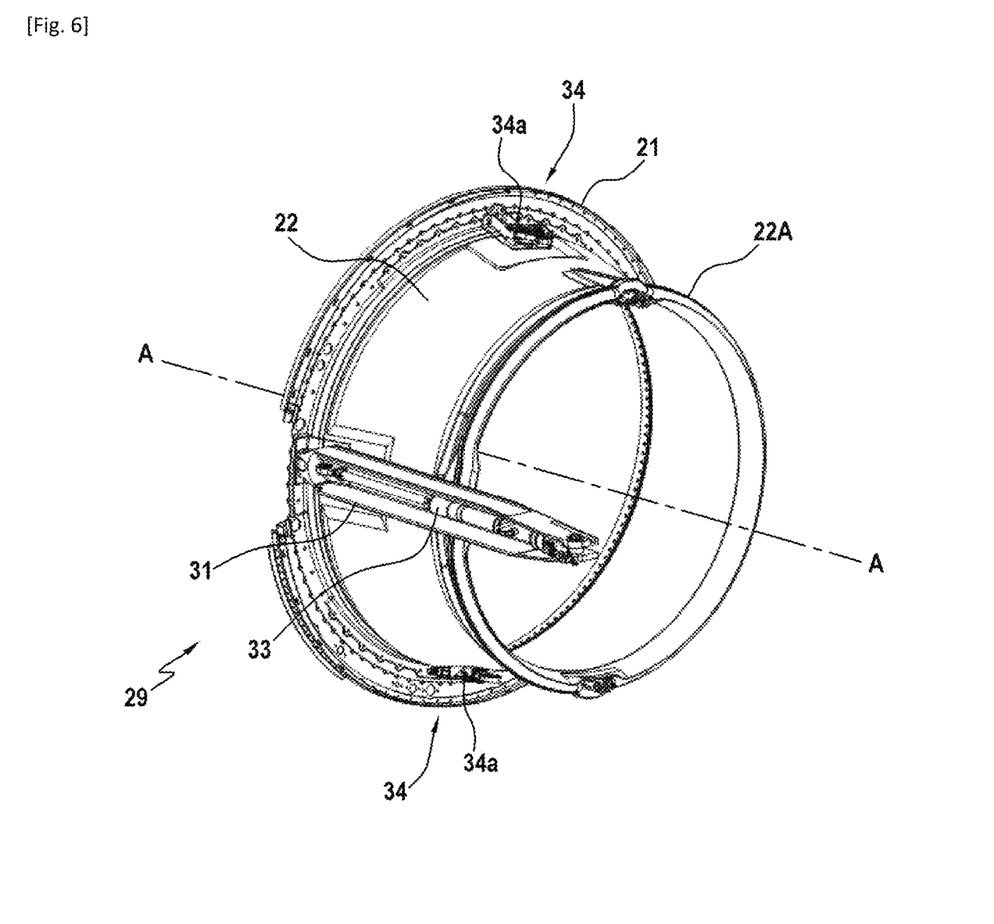
FIG. 6 is a perspective view showing a fixed portion of this thrust reverser assembly.

FIG. 6 shows the stationary portion 29 of the thrust reverser assembly. Noted again are the slide 31 and the jack 33. Also identified are two latches 34, or more exactly the first portions 34a of these latches 34, located on either side of the stationary portion 29. In particular, the first portions 34a of these two latches 34 are arranged on the outer surface of the stationary structure 22, and at substantially 0° and 180° positions when the portion of the jack 33 is at 270°.

Figure 7:
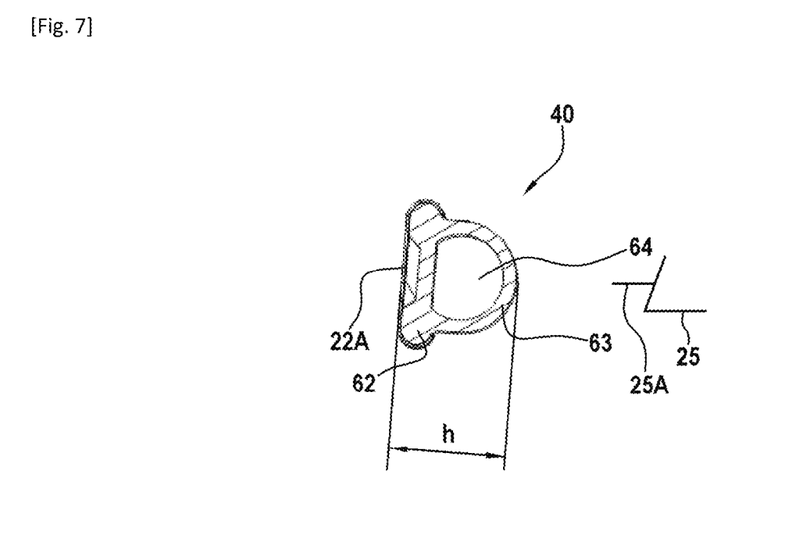
FIG. 7 is a view showing a cross section of a gasket segment.

FIG. 7 is a transverse section corresponding to a view of FIG. 5, showing a gasket segment 41 and the gasket compressor 25A, formed here by a border of the shroud 25, in which the gasket segment 41 is mounted in a gasket support 22A.

The gasket is formed of a body 63 having an internal cavity 64, from which a base 62 with a shape complementary to the shape of the gasket support 22A extends. In particular, the gasket body can have the shape of a circular arc, or any other shape allowing providing a seal by pressing the body 63 against the opposing surface of the shroud 25, for example by having a flat or a substantially rectangular shape. The gasket 40 can also have lips extending radially from the body, in order to reinforce the seal of the gasket 40.

Two embodiments of the gasket 40 will now be described with relation to FIGS. 8A and 8B.

Figure 8A:
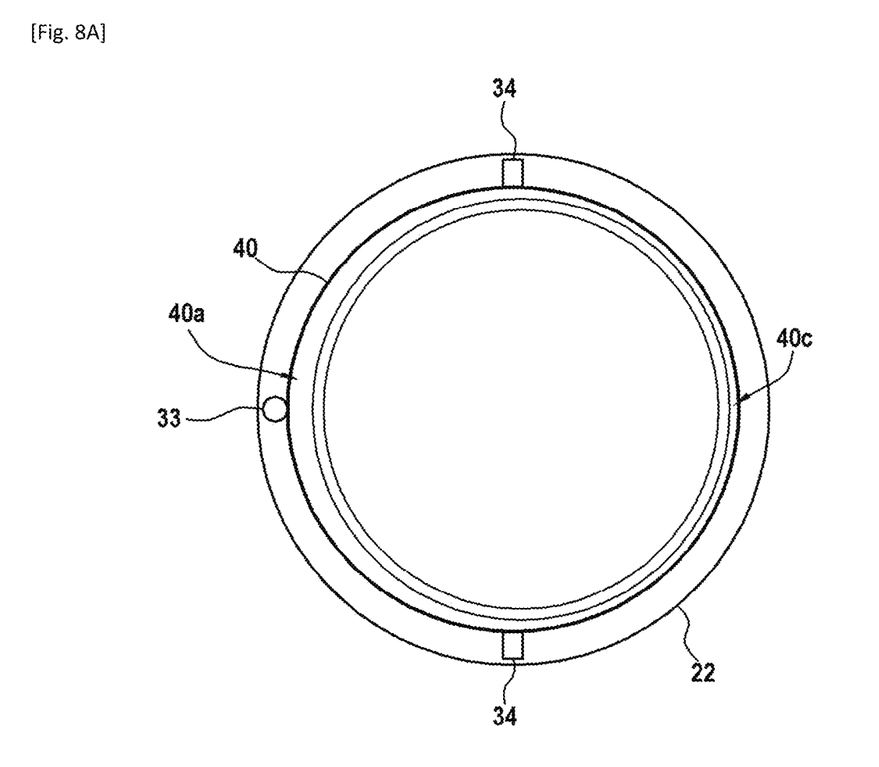
FIG. 8A is a schematic view showing a stationary structure having a gasket according to a first example.

FIG. 8A shows a first example of a gasket 40, on the circumference of which a maximum cross section 40a has a maximum area and a minimum cross section 40c has a minimum area. Between these two positions, the area of a cross section of the gasket 40 varies monotonically and regularly.

Figure 8B:
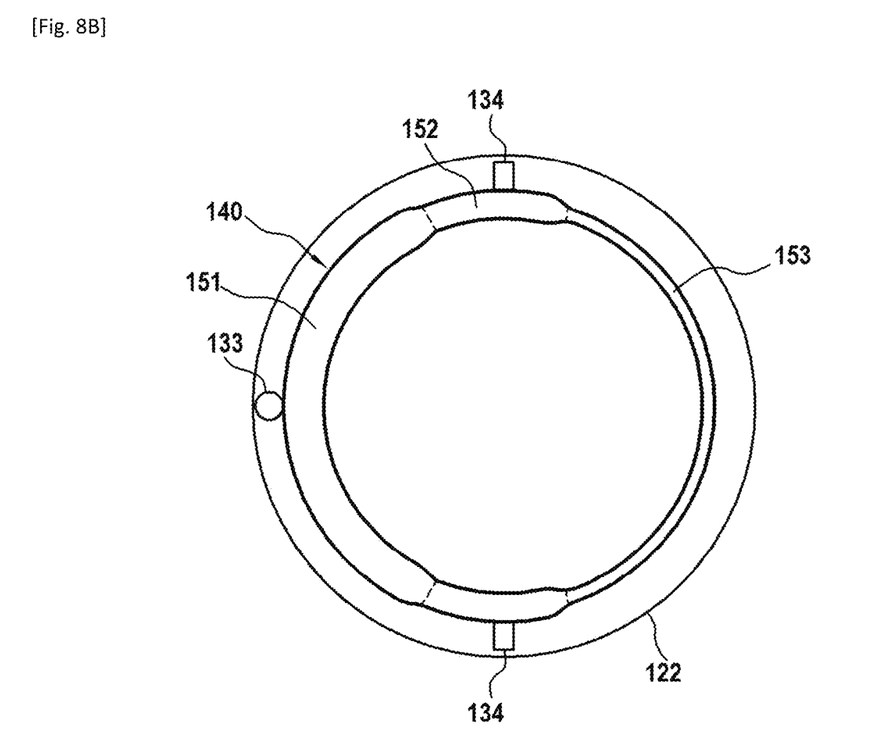
FIG. 8B is a schematic view showing a stationary structure having a gasket according to a second example.

FIG. 8B has a second example of a gasket 140, formed by three portions having cross sections with substantially constant areas, comprising a maximum cross section portion 151, an intermediate cross section portion 152 on either side of the maximum cross section portion 151, the intermediate cross section portion 152 connected to a minimum cross section portion 153. Between two portions with constant area cross sections, the gasket 140 can have a peak and the cross section of the gasket 140 decrease suddenly, or on the contrary the gasket 140 can have junction portions allowing the area of the cross section to vary continuously, and thus limit the risks of sealing loss of the gasket 140.

It is clear for a person skilled in the art that this example is descriptive, and that the number of portions having cross sections with constant areas is not limited to three. Moreover, the examples of FIGS. 8A and 8B have cross sections with variable areas shown with variable widths, but it is clear for a person skilled in the art that the variation of area can also be accomplished by a variation of height independently of a variation of width.

In particular, the gasket 40, 140 can be an annular gasket extending in known fashion, i.e. without interruption of contour, or discontinuous over 360° or less.

In a reverser assembly having a plurality of jacks, the present gasket structure 40, 140 described in relation to FIGS. 8A and 8B is applicable when considering the maximums and minimums of cross section area, width or height as local maximums and minimums.

Figure 9:
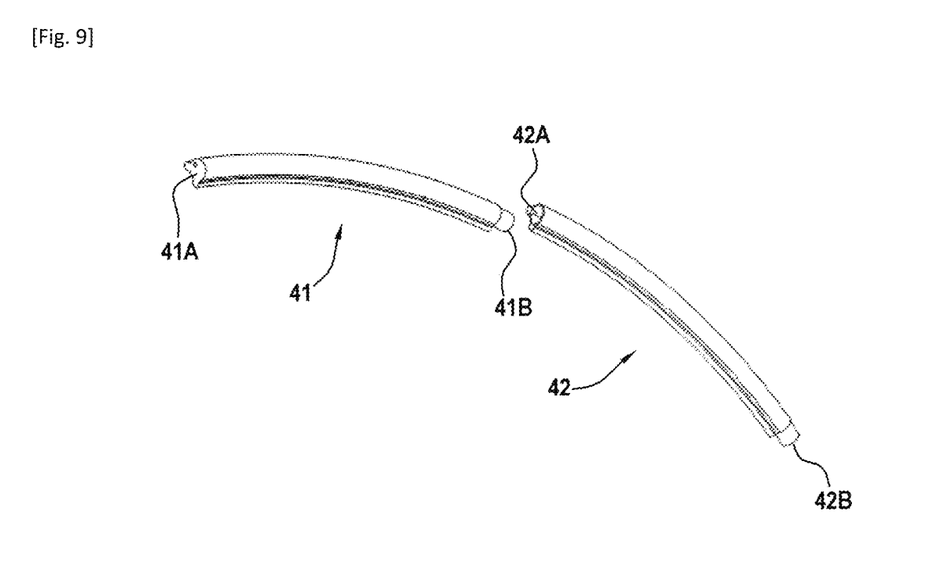
FIG. 9 is a perspective view of two gasket segments.

The gasket 40 can be formed of a plurality of segments nested within each other, for example to facilitate assembly and maintenance operations.

FIG. 9 shows two examples of hollow gasket 40 segments, in which a first segment 41 has two ends 41A, 41B, the end 41B having a shape capable of nesting in an end 42A of a second segment 42, itself having an end 42B capable of nesting with a following segment, and so on to form the complete length of the gasket 40 over its entire circumference.

Figure 10:
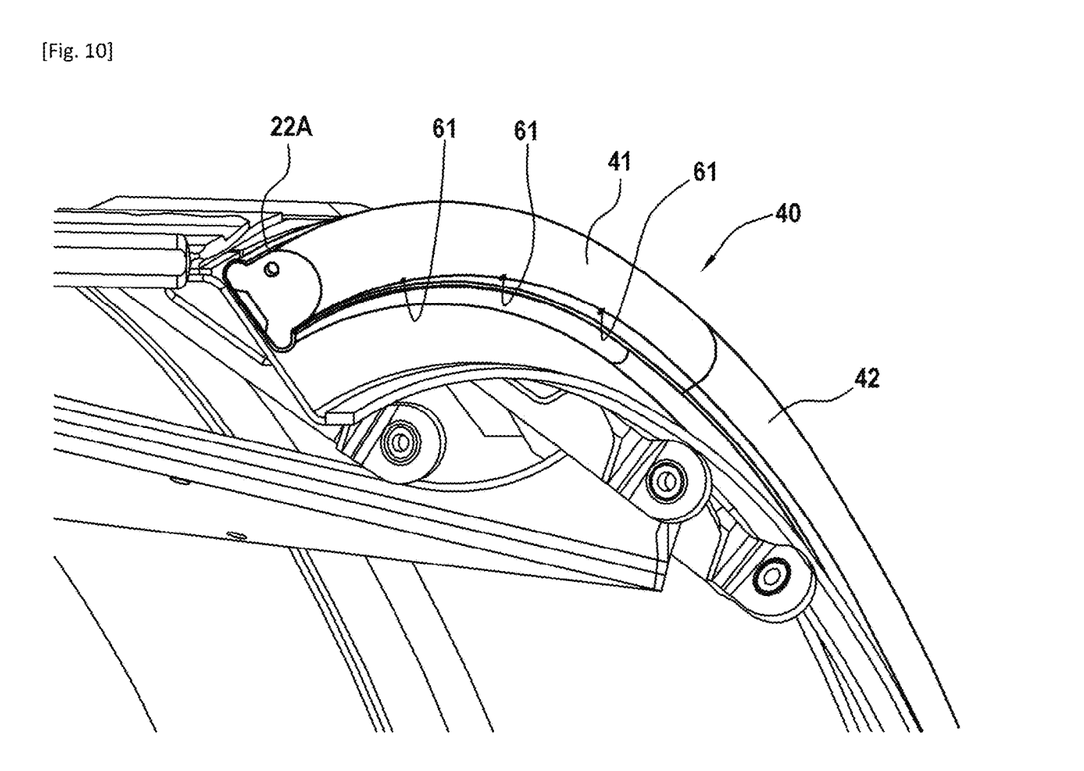
FIG. 10 is a view of the gasket in place.

FIG. 10 shows the segments described in FIG. 9 once assembled and mounted against the stationary structure 22 via the gasket support 22A. Here in particular, the gasket 40 shown in FIG. 9 is not a gasket with a circumference of 360°, the end of the segment 41 not having a shaper for nesting the segment 41 with another segment.

The hollow segment 40 has pressurization holes 61 arranged on an inner surface of the gasket 40, as well as on the end of the segment not connected to another segment, when the gasket is not 360°.

Figure 11A:
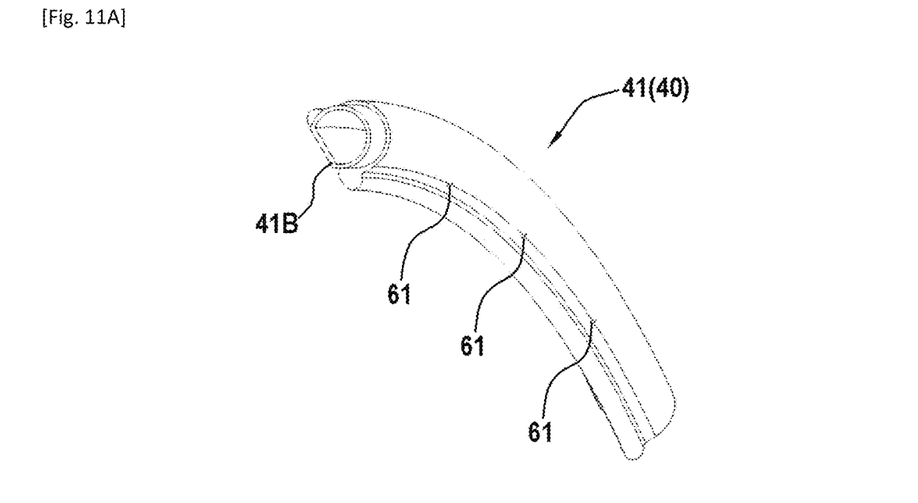
FIG. 11A shows a perspective view of a gasket segment.
Figure 11B:
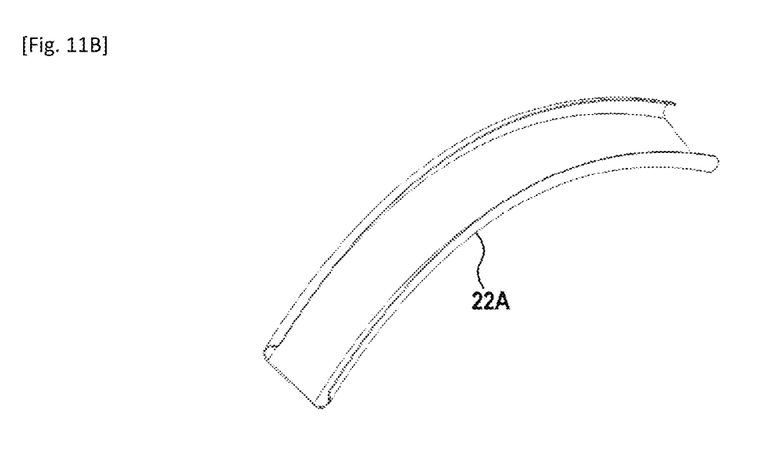
FIG. 11B shows a perspective view of a gasket support.

FIGS. 11A and 11B correspond respectively to a segment 41 of the gasket 40, and to an example of a gasket support 22A capable of accommodating the segment 41.

Although the present invention has been described by referring to specific exemplary embodiments, it is clear that modifications and changes can be carried out on these examples without departing from the general scope of the invention as defined in the claims. In particular, individual features of the different embodiments illustrated/mentioned can be combined into additional embodiments. Consequently, the description and the drawings must be considered in an illustrative, rather than a restrictive sense.

The invention claimed is:

1. A thrust reverser assembly for a turbojet engine, comprising:
  a stationary structure of the thrust reverser assembly, having a main axis;
  a movable shroud, which is capable of moving in translation along the main axis between an attached position, in which the shroud is attached to the stationary structure, and a spaced position, in which the shroud is spaced from the stationary structure;
  at least one latch capable of holding the stationary structure and the shroud in the attached position;
  at least one actuator, mounted between the stationary structure and the shroud, configured to move the shroud along the main axis between the attached position and the spaced position; and a gasket, configured to provide a seal between the stationary structure and the shroud in the attached position, wherein the gasket has a varying cross section along its circumference.

2. The thrust reverser assembly according to claim 1, wherein the height of the gasket decreases monotonically between a maximum cross section having a maximum height and a minimum cross section having a minimum height.

3. The thrust reverser assembly according to claim 2, wherein the maximum cross section is located in proximity to the actuator and the minimum cross section is far from the actuator.

4. The thrust reverser assembly according to claim 1, wherein the gasket comprises several portions having cross sections of substantially constant heights.

5. The thrust reverser assembly according to claim 4, wherein said several portions include a maximum portion having a cross section of maximum height, a minimum portion having a cross section of minimum height, and at least one intermediate portion provided between the maximum and minimum portions.

6. The thrust reverser assembly according to claim 1, wherein the gasket comprises several segments nested within each other.

7. The thrust reverser assembly according to claim 1, wherein the shroud is capable of being brought into an interlocking position, located further forward than the attached position, and wherein the gasket is more compressed than in the attached position, in order to interlock the latch between the stationary structure and the shroud.

8. The thrust reverser assembly according to claim 1, wherein the gasket is hollow and has pressurization holes on an inner face.

9. The thrust reverser assembly according to claim 1, wherein the gasket comprises a body configured to accommodate a gasket compressor of the shroud.

10. The thrust reverser assembly according to claim 1, comprising a single actuator.

11. A propulsion assembly comprising a turbojet engine and a thrust reverser according to claim 1.

* * * * *